Feb. 25, 1958   P. C. VAN DER WILLIGEN ET AL   2,824,948
METHOD OF ELECTRIC ARC-WELDING
Filed March 8, 1954
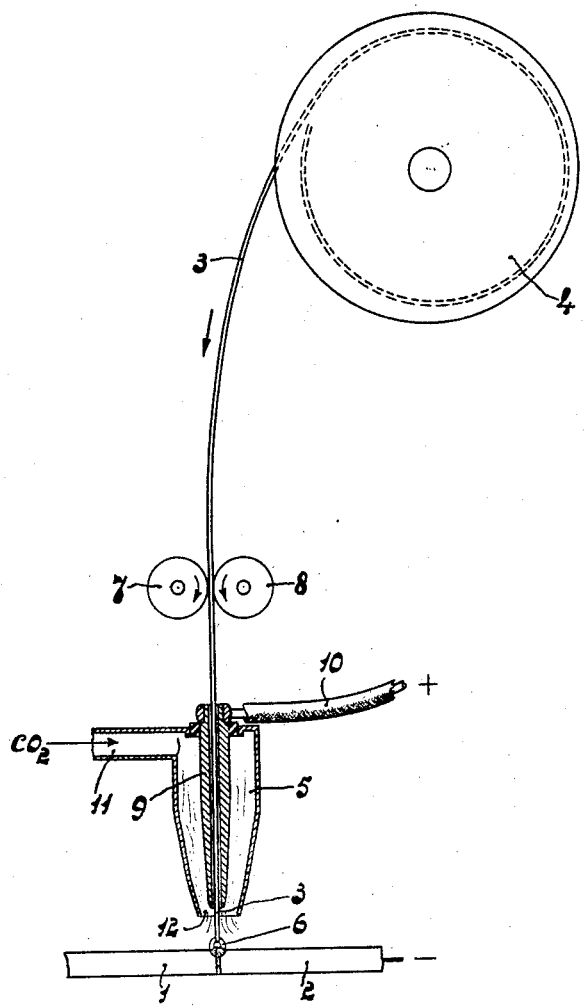
INVENTORS
PAUL CHRISTIAAN VAN DER WILLIGEN
HENRI BIENFAIT
BY
AGENT

United States Patent Office 2,824,948
Patented Feb. 25, 1958

2,824,948

METHOD OF ELECTRIC ARC-WELDING

Paul Christiaan van der Willigen and Henri Bienfait, Eindhoven, Netherlands, assignors, by mesne assignments, to North American Philips Company, Inc., New York, N. Y., a corporation of Delaware Application March 8, 1954, Serial No. 414,832

Claims priority, application Netherlands March 7, 1953

3 Claims. (Cl. 219—74)

The invention relates to a method of electric arc-welding carried out at iron work pieces, on which metal is melted down by striking a flame arc at the "live" end of an uncoated welding wire in a protecting gas.

Consequential to the technique known in welding non-ferrous metals and alloyed iron it has been suggested to use bare welding wires of iron for welding iron work pieces in rare gas.

It has been found (The Welding Journal, page 406S ff., 1952) that the composition of the metal of the work piece exerts a great influence on the porosity of the weld to be obtained and, more especially that the extent of porosity of the weld varies with the extent to which both the iron of the work piece and that of the welding wire has been de-oxidized.

Since this method, owing to the high price of the rare gas, is rather costly it has furthermore been suggested to use mixtures of carbon monoxide and carbon dioxide to protect the molten welding metal from the action of gas of the atmosphere (U. S. Patent No. 2,504,868). It had been suggested previously to use for this purpose gas mixtures containing carbon monoxide and carbon dioxide (U. S. Patents Nos. 1,746,202 and 1,746,205), but these suggestions have never been carried out to an appreciable extent, presumably because the quality of the weld often left to be desired and working with the very poisonous carbon monoxide is inconvenient.

Attempts were repeatedly made to use carbon dioxide for this purpose, however the resultant welds were always unserviceable (cf. for example U. S. Patents Nos. 1,746,202, 1,746,205, 1,717,530 and German patent specification No. 484,090).

In accordance with the invention it has now been found that in the manner described above welding may be carried out with excellent results on iron not de-oxidized or not completely de-oxidized with the use of a protective gas completely consisting of carbonic acid, if use is made of a welding wire alloyed with at least 0.3% by weight of manganese and 0.3% by weight of strongly reducing metal. Iron not de-oxidized or not completely de-oxidized is recognizable since it usually contains segregates. Apart from a small content of iron oxide such iron contains a maximum of 1% by weight of manganese and a few tenths of one percent of another metal. Such kind of iron contains strongly reducing metals to a maximum of a few hundredths of one percent.

Strongly reducing metals suitable for alloys in a welding wire used in the method according to the invention are silicon, titanium, aluminium, chromium, vanadium, and zirconium.

The invention relates to a method of electric arc-welding to be carried out at iron work pieces, on which welding metal is melted down by striking a flame arc at the current-conveying end of a bare welding wire in a protective gas and is characterized in that the welding is carried out on work pieces of iron not de-oxidized or not completely de-oxidized with the aid of a welding wire of iron alloyed with at least 0.3% by weight of manganese and at least 0.3% by weight of a strongly reducing metal, use being made of a protective gas consisting completely of carbon dioxide with the exception of contaminations, if any. Use is preferably made of a welding wire alloyed with manganese, silicon and titanium. Silicon has the advantage of being cheap and, after having formed silicates with other oxides, its oxide readily rises in the liquid metal and separates out as an extremely thin film on the surface of the solidified metal. Titanium produces a high degree of de-oxidation, dissolves satisfactorily in iron and as an oxide it forms a satisfactory slag with $SiO_2$. It was surprising to find that under the conditions described above in welding on work pieces made of rimmed iron a weld of good quality and free from porosity and surface defects is obtainable. It was, moreover, a surprise to find that carbon dioxide reacts with the welding metal only to a comparatively small extent, so that only small part of the reducing metals is oxidized by the action of carbon dioxide on the welding metal.

By carrying out the invention small quantities of strongly de-oxidizing metal may be transferred from the welding wire into the molten metal of the work piece, with which it mixes rapidly, so that iron oxides, always contained in iron not de-oxidized or not completely de-oxidized, are reduced and are not permitted to react with the carbon, also to be found always in the iron, which would produce carbon monoxide, which would give rise to porosity of the weld. Since welding is carried out with the use of a wire containing about 1% by weight of non-ferrous metals and the metal from the welding wire is mixed with the metal of the work piece during the operation and is often oxidized by constituents thereof, it is possible to obtain a weld having completely or substantially completely the same composition as the metal of the work piece, so that also the mechanical properties of the metal of the weld correspond to those of the work piece metal, which is, in general, desirable with respect to the requirements for a welding joint.

It is advisable to carry out the method according to the invention with the aid of high current density in the welding wire, i. e. a density of more than 10,000 A./cm.$^3$. Thus the arc remains satisfactorily directed towards the work piece during the welding operation. Moreover, the arc penetrates deeply into the work piece, so that it is possible to provide a square butt joint without providing a preliminary opening in a comparatively thick plate of, for example, 10 mms. in thickness by melting down metal on either side of the work piece.

Since, in general, the weld should not be too wide, use is preferably made of a welding wire of 1.5 to 3.5 mms. in thickness.

Since the welding wire is consumed at a high rate, the method according to the invention is particularly suitable for continuous operation, in which welding wire and protective gas are continuously supplied to the flame arc; use is therefore preferably made of a welding apparatus comprising a welding head having a guide tube for the continuous supply of welding wire; the guide tube may be connected to a current source, provision being made of a space to which gas can be supplied, the gas being permitted to escape at one end of the guide tube. The welding head is preferably arranged in a manner such that it is spaced apart from the flame arc by not more than 5 cms.

Such an apparatus is described for welding wires of non-ferrous metals and alloyed iron, use being made of rare gas for protection.

The invention has the advantage that the cheap and unpoisonous carbon dioxide may be used as a protective gas and be obtained in the liquid or solid state in comparatively large quantities in vessels and cylinders and be manufactured, moreover, locally.

Compared with argon carbon dioxide has the additional advantage that a gas consumption of 5 to 15 litres per minute provides adequate protection, whereas in the case of argon at least 25 litres per minute is to be conveyed through and along the arc.

The invention also permits of making long welds in a comparatively short time, since the welding head may be displaced at a rate of more than 100, for example, 150 cms. a minute along the weld, without obtaining a defective weld. This rapid displacement prevents the heat produced by the arc from penetrating deeply into the work piece, so that only a slight deformation occurs.

In carrying out the invention it is advisable to free the work pieces at the area of the weld to be made previously as completely as possible from iron oxide, which is found often as iron rust and in the form of a skin due to rolling, since this would give rise to porosity.

The invention will be carried out preferably with the use of direct voltage. If alternating current is used, measures must be taken to stabilize the arc.

In order that the invention may be carried into effect, it will now be described with reference to one embodiment.

The figure is a schematic representation of the welding apparatus showing the welding head shown in section.

Referring to the figure reference numerals 1 and 2 designate two plates of iron not de-oxidized or not completely de-oxidized, of 10 mms. in thickness, the area of the weld to be made being freed from oxides. The welding wire 3 is provided for the greater part of the reel 4, from where it travels through the guide tube 9 into the welding head 5, shown in a sectional view and arrives above the gap between the plates 1 and 2. At the end of the wire 3 burns a flame arc 6. The welding wire 3 travels along two driven wheels 7 and 8 for displacing the welding wire, through the guide tube 9 to the flame arc 6 and the plates 1 and 2. Through a cable 10 electric current is supplied via the guide tube 9 to the welding wire 3. Carbon dioxide from a cylinder containing liquid carbon or from a container of solid carbon dioxide is supplied through a duct 11 to the welding head 5, the gas escaping from the welding head through the aperture 12.

During the welding operation the driven wheels 7 and 8 draw welding wire of 2 mms. in thickness from the reel 4 and supply it to the flame arc 6 which melts the welding wire with the same speed, i. e. of 4.5 metres a minute. Through the cable 10 a direct current of 470 A. (positive terminal) is supplied to the welding wire in order to maintain the welding arc 6. The quantity of carbon dioxide gas supply per minute is 10 litres (1 atm., room temperature). The welding head is displaced at a rate of 125 cms. a minute along the gap.

After a weld has been made throughout the length of the gap, the work piece is turned over and a weld is made also on the other side. The welding joint obtained is free from porosity, as is evident from a radiograph and exhibits a smooth surface. In a section the gap is found to be completely filled with metal. If the two plates 1 and 2 are joined in a similar manner by a lying angular weld, the operation is carried out in three processes, the conditions being entirely the same with the exception of the rate of displacement of the welding head, which is 70 cms. a minute. Also in this case a smooth, perfect weld is obtained. The following table shows the content of carbon and alloying metal of the work piece, the welding wire and the weld.

|  | C | Mn | Si | Ti |
|---|---|---|---|---|
| Plate | 0.16 | 0.61 | 0.02 | 0 |
| Wire | 0.05 | 0.40 | 0.41 | 0.21 |
| Weld | 0.09 | 0.25 | 0.12 | 0 |

What is claimed is:
1. A method of electric arc welding on a work piece of rimmed steel or semi-killed steel comprising striking an arc between a welding wire and said work piece in a region adjacent to the area of said work piece to be welded, continuously feeding the wire to said area to be welded, depositing melted welding wire in said area, and delivering approximately 100 percent carbon dioxide adjacent the arc, said wire being constituted of iron alloyed with at least 0.3% by weight of manganese and at least 0.3% by weight of a strongly reducing metal.

2. A method of electric arc welding as claimed in claim 1 wherein said strongly reducing material is a metal selected from the group consisting of silicon, titanium, aluminum, chromium, vanadium, and zirconium.

3. A method of electric arc welding as claimed in claim 1 in which said welding wire is constituted of iron alloyed with manganese, silicon and titanium.

References Cited in the file of this patent
UNITED STATES PATENTS

| 1,187,411 | Wilson | June 13, 1916 |
| 1,350,317 | Kingsbury | Aug. 24, 1920 |
| 1,452,781 | Beckett | Apr. 24, 1923 |
| 1,468,937 | Armstrong | Sept. 25, 1923 |
| 1,501,266 | Brace | July 15, 1924 |
| 1,746,205 | Thomson | Feb. 4, 1930 |
| 1,794,042 | Strohmenger | Feb. 24, 1931 |
| 1,972,463 | Schlecht | Sept. 4, 1934 |
| 2,140,237 | Leitner | Dec. 13, 1938 |
| 2,504,867 | Muller | Apr. 18, 1950 |
| 2,621,278 | Muller | Dec. 9, 1952 |